UNITED STATES PATENT OFFICE.

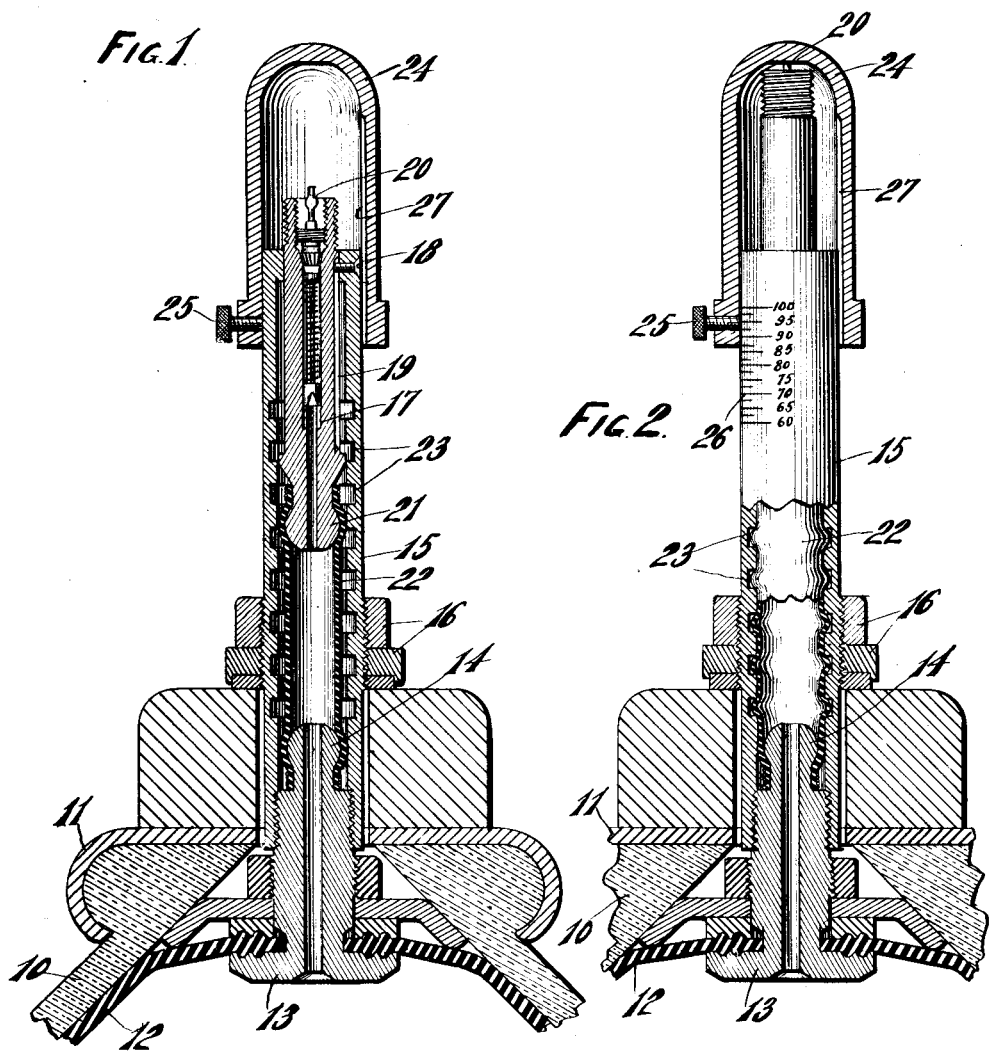

RAYMOND F. TIBBETTS, OF MILWAUKEE, WISCONSIN, ASSIGNOR OF ONE-HALF TO EDWARD FIEBRICH, OF RACINE, WISCONSIN.

RELIEF-VALVE FOR PNEUMATIC TIRES.

1,137,034.  Specification of Letters Patent.  Patented Apr. 27, 1915.

Application filed December 7, 1914. Serial No. 875,837.

*To all whom it may concern:*

Be it known that I, RAYMOND F. TIBBETTS, a citizen of the United States, and resident of Milwaukee, in the county of Milwaukee and State of Wisconsin, have invented new and useful Improvements in Relief-Valves for Pneumatic Tires, of which the following is a description, reference being had to the accompanying drawings, which are a part of this specification.

This invention has for its object to provide a relief valve for pneumatic tires which will automatically open to permit the escape of air when the pressure within the tire becomes abnormal as by the increase thereof due to the air becoming heated either by the friction of the tire itself or by the action of the sun, such increase in pressure serving to move the charging valve until its valve stem is depressed by engaging an obstruction, thus permitting the air to escape until a pre-determined normal pressure is attained.

Another object of the invention is to provide such a relief valve for pneumatic tires which will be sensitive to a gradual increase in pressure but which will be unaffected by a sudden increase in pressure as upon a tire forcibly striking a rock or other obstruction in the road.

Another object of the invention is to provide such a relief valve with an adjustable cap which may be positioned on the valve casing according to the maximum pressure desired for the tire according to a scale appearing on the valve casing and when so positioned serving to open the valve to relieve the air pressure when the air pressure reaches such pre-determined maximum amount.

With the above and other objects in view the invention consists in the relief valve for pneumatic tires as herein claimed and all equivalents.

Referring to the accompanying drawings in which like characters of reference indicate the same parts in different views: Figure 1 is a longitudinal sectional view of a relief valve for pneumatic tires constructed in accordance with this invention, the parts being in their normal condition; and Fig. 2 is a similar view with parts in elevation and showing the valve in the act of being released under abnormal pressure.

In these drawings 10 indicates a vehicle tire engaged with a wheel rim 11 as usual and containing an inner inflatable tube 12 with a valve connection 13 of common construction. The valve connection 13 however instead of forming the valve casing as usual terminates in a bulb like tube connection 14 and is provided with screw threads upon which the valve casing 15 is threaded.

Jam nuts 16 are threaded on the outside of the valve casing 15 and clamped against the wooden wheel felly.

A valve tube 17 is slidably mounted in the end of the valve casing 15 and is held against turning therein by means of a set screw 18 engaging a keyway 19 in the valve tube, said valve tube containing an ordinary charging valve 20 or check valve commonly known as the Schraeder valve. The lower end of the valve tube 17 has a bulb like tube connection 21 like the connection 14 and upon these two connections are fitted the ends of a rubber tube 22 which is of smaller diameter than the valve casing and is subject to the pressure of the air within the tire so as to be capable of elongation and lateral distention.

A series of grooves 23 are formed in the interior of the valve casing 15 to form detaining pockets into which the rubber tube 22 expands by its lateral distention when the tire is subjected to abnormal pressure. These detaining grooves retard the elongation of the tube 22, but the increase of pressure in the tire serves to force the valve tube 17 outwardly until the valve stem 20 carried thereby engages a cap 24 which slidably fits on the valve casing 15 and is held in its adjustments thereon by means of a set screw 25, such adjustments being determined by a scale of graduation marks 26 on the valve casing 15 indicating the maximum pressure of the tire at which the valve stem 20 engages the interior of the cap 24 to release the air from the tire. The air escaping from the valve is free to pass out of the cap through a longitudinal groove 27 in the inner surface of the cap and when a sufficient amount of air has escaped from the valve to permit the rubber tube 22 to slightly contract the valve stem is carried away from the cap so that the valve again closes to confine the remainder of the air in the tire. Thus the tire is protected against an overpressure that would be liable to injure it.

This relief of air only takes place upon the attainment of the abnormal pressure gradually, upon a sudden increase of pressure as when the tire strikes an obstruction in the road the resistance to the longitudinal extension of the rubber tube 22 caused by its filling in the annular grooves 23 of the valve casing retards its elongation until after such sudden increase in pressure has subsided.

What I claim as new and desire to secure by Letters Patent is:

1. A relief valve for pneumatic tires, comprising an elastic tube, means for connecting one end of the tube with the interior of a pneumatic tire, a valve mechanism connected with the other end of the elastic tube and movable therewith by the elongation of the elastic tube under abnormal pressure, said valve mechanism having a projecting valve stem, means in the path of the valve stem to be engaged thereby for opening the valve, and a casing surrounding the elastic tube having a roughened surface to be engaged by the elastic tube in its lateral distention to retard its elongation.

2. A relief valve for pneumatic tires, comprising an elastic tube, means for connecting one end of the elastic tube with the interior of the tire, a valve mechanism carried by the other end of the elastic tube, said valve mechanism having a projecting valve stem, a casing surrounding the elastic tube, a cap on the casing to be engaged by the valve stem for unseating the valve when the elastic tube becomes elongated under abnormal pressure, said casing having a series of grooves upon its inner surface to have the elastic tube fit therein by lateral distention thereof under abnormal pressure and so retard elongation of the elastic tube.

In testimony whereof, I affix my signature, in presence of two witnesses.

RAYMOND F. TIBBETTS.

Witnesses:
R. S. C. CALDWELL,
KATHERINE HOLT.